United States Patent
Lange et al.

(10) Patent No.: US 11,664,695 B2
(45) Date of Patent: May 30, 2023

(54) METHOD FOR DESIGNING A STATOR SEGMENT FOR A STATOR OF A SYNCHRONOUS RELUCTANCE MACHINE AND CORRESPONDING STATOR AND CORRESPONDING RELUCTANCE MACHINE

(71) Applicant: Rheinisch-Westfälische Technische Hochschule (RWTH) Aachen, Aachen (DE)

(72) Inventors: Tobias Lange, Aachen (DE); Claude Pascal Weiss, Aachen (DE); Jan-Dirk Reimers, Aachen (DE); Tobias Berthold, Düren (DE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 121 days.

(21) Appl. No.: 16/765,988

(22) PCT Filed: Nov. 20, 2018

(86) PCT No.: PCT/EP2018/081842
§ 371 (c)(1),
(2) Date: May 21, 2020

(87) PCT Pub. No.: WO2019/101705
PCT Pub. Date: May 31, 2019

(65) Prior Publication Data
US 2020/0358328 A1    Nov. 12, 2020

(30) Foreign Application Priority Data
Nov. 21, 2017  (DE) .......................... 102017127502.9

(51) Int. Cl.
*H02K 3/28*     (2006.01)
*H02K 1/14*     (2006.01)
(Continued)

(52) U.S. Cl.
CPC .................. *H02K 3/28* (2013.01); *H02K 1/14* (2013.01); *H02K 15/095* (2013.01); *H02K 19/10* (2013.01); *H02K 2213/03* (2013.01)

(58) Field of Classification Search
CPC .......... H02K 15/04; H02K 15/02; H02K 3/28; H02K 1/2733; H02K 1/265; H02K 1/26;
(Continued)

(56) References Cited

U.S. PATENT DOCUMENTS 5,117,144 A   5/1992   Török
5,994,814 A   11/1999  Kawabata et al.
(Continued)

FOREIGN PATENT DOCUMENTS

CN    104993629 A       10/2015
DE    102011078128 A1 * 12/2012  ................ B60S 1/08
(Continued)

OTHER PUBLICATIONS

DE-102011078128-A1 machine translation Feb. 12, 2022.*
(Continued)

*Primary Examiner* — Ahmed Elnakib
*Assistant Examiner* — Leda T Pham
(74) *Attorney, Agent, or Firm* — Reising Ethington, P.C.

(57) ABSTRACT

The disclosure relates to a method for designing a stator segment for a stator of an m-phase synchronous reluctance machine with concentrated windings, the stator being divided into a stator segment or a plurality of stator segments and comprising a ferromagnetic base body with peripherally distributed tooth structures and a winding system mounted in the base body, which comprises, per stator segment, z
(Continued)

tooth structures and a number of winding phases (U, V, W) corresponding to the number of phases m, each of said winding phases comprising a series connection and/or a parallel connection of a plurality of the concentrated windings, a rotor of the synchronous reluctance machine comprising a pole number p in a peripheral section corresponding to the stator segment.

14 Claims, 1 Drawing Sheet

(51) Int. Cl.
*H02K 15/095* (2006.01)
*H02K 19/10* (2006.01)
(58) Field of Classification Search
CPC ........ H02K 1/223; H02K 1/27; H02K 1/2706; H02K 1/2713; H02K 1/272; H02K 1/274
See application file for complete search history.

(56) References Cited

U.S. PATENT DOCUMENTS

| | | | |
|---|---|---|---|
| 2007/0007841 A1* | 1/2007 | Tamaoka | H02K 21/16 310/90 |
| 2007/0257566 A1* | 11/2007 | Vollmer | H02K 3/28 310/180 |
| 2012/0194040 A1 | 8/2012 | Hao et al. | |
| 2015/0229174 A1 | 8/2015 | Tokizawa | |
| 2015/0295456 A1 | 10/2015 | Michaelides et al. | |
| 2016/0308415 A1* | 10/2016 | Dajaku | H02K 1/16 |
| 2020/0358328 A1* | 11/2020 | Lange | H02K 29/03 |

FOREIGN PATENT DOCUMENTS

| | | |
|---|---|---|
| JP | 2001186736 A | 7/2001 |
| SU | 1690103 A1 | 11/1991 |

OTHER PUBLICATIONS

Mihail V. Cistelecan et al., Three phase tooth-concentrated interspersed windings with low space harmonic content, The XIX International Conference on Electrical Machines—ICEM 2010, Sep. 6-8, 2010, 6 pages.

J. A. Guemes et al., Comparative study of PMSM with integer-slot and fractional-slot windings, The XIX International Conference on Electrical Machines—ICEM 2010, Sep. 6-8, 2010, 6 pages.

Xiao Chen et al., Permanent Magnet Assisted Synchronous Reluctance Machine with fractional-slot winding configurations, 2013 International Electric Machines & Drives Conference, May 12-15, 2013, 8 pages.

Gurakuq Dajaku et al., New Self-Excited Synchronous Machine with Tooth Concentrated Winding, 2013 World Electric Vehicle Symposium and Exhibition (EVS27), Nov. 17-20, 2013, 6 pages.

Matteo Gamba et al., A new PM-assisted Synchronous Reluctance machine with a nonconventional fractional slot per pole combination, 2014 International Conference on Optimization of Electrical and Electronic Equipment (OPTIM), May 22-24, 2014, 8 pages.

Christopher M. Spargo et al., Application of Fractional-Slot Concentrated Windings to Synchronous Reluctance Motors, IEEE Transactions on Industry Applications (vol. 51, Issue: 2, Mar.-Apr. 2015), 10 pages.

Gurakuq Dajaku et al., Comparison of two FSCW PM machines for integrated traction motor/generator, 2015 IEEE International Electric Machines & Drives Conference (IEMDC), May 10-13, 2015, 8 pages.

Bastian Lehner et al., Design considerations for concentrated winding synchronous reluctance machines, 2016 IEEE Transportation Electrification Conference and Expo, Asia-Pacific (ITEC Asia-Pacific), Jun. 1-4, 2016, 6 pages.

Gurakuq Dajaku et al., Comparison of Two Different IPM Traction Machines With Concentrated Winding, IEEE Transactions on Industrial Electronics (vol. 63, Issue: 7, Jul. 2016), Mar. 21, 2016, pp. 4137-4149.

Wolfgang Gruber et al., Design of a novel bearingless permanent magnet vernier slice motor with external rotor, 2017 IEEE International Electric Machines and Drives Conference (IEMDC), May 21-24, 2017, 6 pages.

International Search Report for PCT/EP2018/081842 dated Jan. 28, 2019, 6 pages.

English Translation of International Search Report for PCT/EP2018/081842 dated Jan. 28, 2019, 4 pages.

Chinese Office Action for Chinese Application No. 201811343352.1 dated Sep. 30, 2021 (9 pages).

English Translation of Chinese Office Action for Chinese Application No. 201811343352.1 dated Sep. 30, 2021 (3 pages).

* cited by examiner

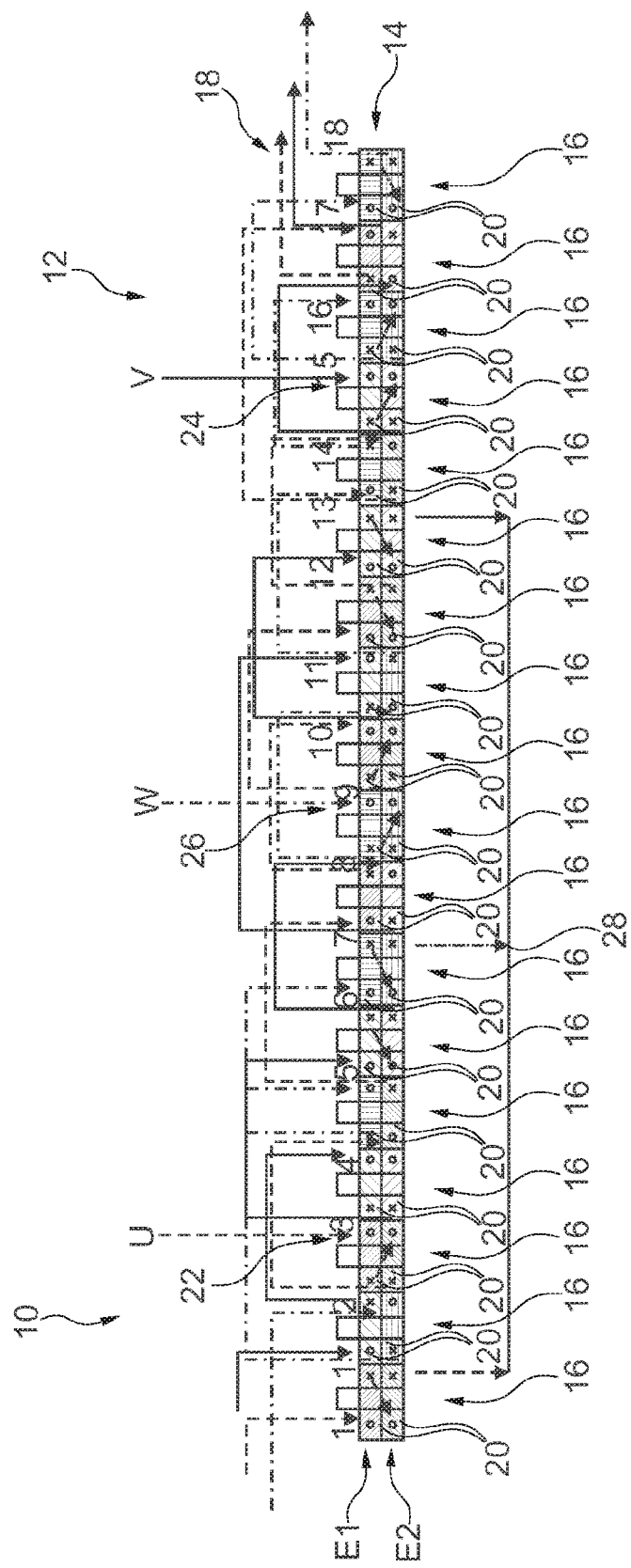

METHOD FOR DESIGNING A STATOR SEGMENT FOR A STATOR OF A SYNCHRONOUS RELUCTANCE MACHINE AND CORRESPONDING STATOR AND CORRESPONDING RELUCTANCE MACHINE

INTRODUCTION

The disclosure relates to a method for designing a stator segment for a stator of an m-phase synchronous reluctance machine with concentrated windings, wherein the stator (a) can be divided into a single stator segment or into a plurality of stator segments and (b) comprises a ferromagnetic base body with peripherally distributed tooth structures and a winding system mounted in the base body, which comprises, per stator segment, z tooth structures and a number of winding phases corresponding to the number of phases m, wherein each of said winding phases in turn comprises a series and/or parallel connection of a plurality of the concentrated windings, wherein a rotor of the synchronous reluctance machine comprises a pole number p in a peripheral section corresponding to the stator segment.

The disclosure further relates to a stator for a corresponding m-phase synchronous reluctance machine and a corresponding m-phase synchronous reluctance machine.

Synchronous reluctance machines are used as a cost-neutral replacement for asynchronous motors due to their high robustness and high efficiency. The reluctance machine is even technologically superior to the asynchronous machine for use as a variable-speed drive with use of an additionally installed frequency converter. In contrast to the permanent magnet synchronous machine, the reluctance machine has a cost advantage due to the missing magnets, but has a disadvantage in the torque density.

Conventional synchronous reluctance motors used today are constructively based on a design with a distributed stator winding, as is already known from asynchronous motors. Distributed windings generate a sinusoidal magnetomotive force (MMF) with very low harmonic interference components. This reduces the flux leakage to a minimum and the machine can be used to a high degree. The counter voltage is correspondingly low, so that moreover a high power factor can be achieved.

In contrast to distributed windings the concentrated windings (also referred to as tooth coils), which are preferred to be used herein, can be produced very easily and inexpensively in production plants. For example, the windings can be manufactured completely ready for installation externally, they can be easily automated in the production, the installation is also easy to mechanize, contrary to the distributed winding. The added value can be divided into partial steps and processed sequentially, whereas distributed windings still require manual production of the winding system that is often not mechanizable and must be carried out centrally on the machine. Thus—due to the introduction of electromobility into the branch of electric motors focussed hitherto purely according to industrial aspects—a strong trend in direction of concentrated windings is present on the market.

In contrast to the distributed windings stator winding systems with concentrated windings (tooth coils) work with a higher spatial harmonic component, so that there are additional harmonic interference components compared to distributed windings in the connected winding system of the machine. Because of this, these winding types principally can be used for synchronous reluctance motors but are disadvantageous. In addition, concentrated windings only achieve low torque densities, since not all rotor poles are used equally. Furthermore, superimpositions often lead to considerable torque ripples. These two effects, too, result from the harmonic interference components. Thus, either the torque density is very low or the power factor is comparably low.

The scientific article Lehner, B. and Gerling, D.: "Design Considerations for Concentrated Winding Synchronous Reluctance Machines"; IEEE Transportation Electrification Conference and Expo (2016) describes the design of concentrated windings for a synchronous reluctance machine with such concentrated windings. The machine achieves an acceptably high performance factor. The torque density is comparable to those of asynchronous motors available on the market.

SUMMARY

It is an object of the disclosure, per an embodiment, to provide a method for designing a stator segment for a stator of a synchronous reluctance machine, a stator which can be divided into a single stator segment or into several stator segments and a corresponding synchronous reluctance machine, wherein the synchronous reluctance machine has a high torque density and a high efficiency.

In the method according to an embodiment of the disclosure for designing a stator segment for a stator of an m-phase synchronous reluctance machine with concentrated windings, wherein the stator can be divided into a single stator segment or into a plurality of stator segments and comprises a ferromagnetic base body with peripherally distributed tooth structures and a winding system mounted in the base body, wherein the winding system for each stator segment comprises z tooth structures and a number of winding phases (winding strands) corresponding to the number of phases m, each of said winding phases in turn comprises a series and/or parallel connection of a plurality of the concentrated windings, wherein a rotor of the synchronous reluctance machine in a peripheral section corresponding to the stator segment comprises a pole number p, it is provided that the method includes the following steps:

(i) selecting a stator tooth number z of the tooth structures in the segment depending on the number of phases m and the pole number p;

(ii) determining the winding factor $F_W$ and a torque factor $F_T$ with $$F_T = 1 - \int_0^{2\pi/K} \left( \frac{[MMF(\theta) - H_P(\theta)]}{MMF(\theta)} \right)^2 d\theta$$

for a plurality of design and arrangement options for the winding phases, which result from the given variables pole number p and number of phases m when using concentrated windings with respect to the stator tooth number z, wherein $\theta$ is the angle in the stator rotation direction, MMF (MMF: magnetomotive force) is a measure for the spatial distribution of the electric loading, $H_P$ is the harmonic amplitude respectively over the angle $\theta$ and K is a division factor indicating the proportion of the stator segment in the total periphery of the stator; and (iii) determining at least one design of the stator segment in which the formula product of winding factor and torque factor $F_T \cdot F_W$ has a local maximum. Subsequently this determined design or one of these determined designs is selected.

The winding system designed and presented by use of this method, according to an embodiment, can be applied to different stator and pole configurations and achieves a very high torque density with good efficiency and power factor while maintaining all production-related advantages of windings (tooth coils) individually integrated in the stator. In addition, a high degree of divisibility of the stator can be achieved by the implementation as a concentrated winding which enables additional production-related and application-specific advantages without restricting the performance data of the basic machine. The development of the machine is carried out by use of this evaluation method, which, according to the process, expediently shows the ongoing influence of the harmonics for torque generation.

In particular, it is provided that the plurality of design and arrangement options of the winding phases, for which the winding and torque factors $F_W$, $F_T$ are determined, are covered by a variation of the number of windings and/or the distribution of these windings over the tooth structures of the stator segment.

It is advantageous, according to an embodiment, to provide a single winding or a plurality of windings per tooth structure. If a plurality of windings is provided per tooth structure, these are preferably arranged on different levels with respect to the height of the tooth structure.

According to an embodiment of the disclosure it is provided that for the systematic review of the design and arrangement options of the winding phases
(a) the tooth structures are divided into several levels with respect to their tooth height,
(b) a tooth-specific winding is assigned to each tooth structure on each of the levels, so that the same sequence of windings is achieved on each level,
(c) the windings are connected to the winding phases, and
(d) the positions of the windings are permuted by shifting the sequence level-wise with respect to the tooth structures.

A tooth structure comprises a total of N windings, which are distributed to n windings (with n=1, 2, 3, . . . ), wherein for dividing the number of windings of the e.g. two windings (n=2) per tooth structure N1 is or may be equal to N2, or N1 is or may not be equal to N2. Depending on the manufacturing process, different winding structures can also be useful with an identical number of windings or even a different number of windings, so that an assembly can be achieved with an optimized degree of filling.

Thus, conical or parallel windings can alternately be installed on the machine without interrupting the relationship according to the formula.

According to a further embodiment of the disclosure it is provided that the selection of the at least one design is implemented depending on the size of the torque factor $F_T$, in particular only for a torque factor $F_T \geq 0.5$. Lower torque factors can be achieved by use of other methods.

According to yet another embodiment of the disclosure it is provided that the selection of the at least one design is implemented only for a number of stator teeth z of the tooth structures per stator segment which is smaller than the product of the number of phases m and the pole number p (z<m·p).

According to a further embodiment of the disclosure it is provided that the winding factor $F_W$ is determined from existing data sets, in particular from data sets available as literature values. In the simplest case, this is a "reading from table values". Alternatively, the winding factor $F_W$ is calculated individually. In particular for configurations that deviate from the literature, the winding factor $F_W$ must be calculated individually.

According to a further embodiment of the disclosure, the method includes the further step of geometrically pre-designing a bore volume on the basis of desired performance data and/or a predetermined mean rotational shear density.

Finally, it is provided, according to an embodiment, that the method includes the further step of fine-tuning at least one of the variables
flow cross sections,
electric loading and
magnetic quantity/reluctance proportion ratio
by means of the DOE method or other known methods.

In the stator according to an embodiment of the disclosure for an m-phase synchronous reluctance machine with concentrated windings, which can be divided into one or more stator segments and comprises a ferromagnetic base body with peripherally distributed tooth structures and a winding system mounted in the base body, which comprises per stator segment z tooth structures and a number of winding phases (winding strands) corresponding to the number of phases m, wherein each winding phase in turn comprises a series and/or parallel connection of a plurality of the concentrated windings, wherein a rotor of the synchronous reluctance machine has a pole number p in a peripheral section corresponding to the stator segment, it is provided that the number of phases is m=3, the pole number p=10 and the number of stator teeth is 15 or 18 or 21. Such a design of the stator is based in particular on the result of the abovementioned method.

According to an embodiment of the stator according to the disclosure it is provided that the tooth structures are divided into a plurality of levels with respect to their tooth height, the same sequence of windings is achieved on each of the levels in the peripheral direction and the sequence of one of the levels compared to the sequence of at least another one of the levels is offset by at least one tooth structure. Preferably, per an embodiment, two levels are provided, wherein particularly preferred the sequence of the one level is offset by seven tooth structures compared to the sequence of at least the other level.

According to a further embodiment of the stator according to the disclosure it is provided that for the number of phases m=3, the pole number p=10 and the number of stator teeth 18 each of the three winding phases U, V, W comprises a series connection of twelve concentrated windings which have the following winding scheme with respect to a phase-specific (strand-specific) first tooth structure position: the first and the second winding at said first position, the third winding at the third position, the fourth winding at the sixth position, the fifth and sixth windings at the eighth position, the seventh and eighth windings at the tenth position, the ninth winding at the twelfth position, the tenth winding at the fifteenth position and the eleventh and twelfth windings at the seventeenth position. If the stator is divided into a plurality of segments, this scheme is achieved in the peripheral direction across segments.

It is provided, per an embodiment, that for each of the three winding phases U, V, W
the first winding, the second winding, the fifth winding, the sixth winding, the ninth winding and the tenth winding are wound in one orientation around the respective tooth structure and
the third winding, the fourth winding, the seventh winding, the eighth winding, the eleventh winding and the twelfth winding are wound in the opposite orientation around the respective tooth structure.

In the synchronous reluctance machine according to the disclosure with concentrated windings which comprises a stator and a rotor it is provided according to the disclosure that the stator is designed as the aforementioned stator.

The disclosure is described below with reference to the accompanying drawing based on a preferred exemplary embodiment by way of example, wherein the features shown below, both individually and in combination, may represent an aspect of the disclosure.

BRIEF DESCRIPTION OF THE FIGURES

In the drawing:

FIG. 1 is a schematic representation of a stator segment of a stator according to an embodiment of the disclosure.

DETAILED DESCRIPTION

Here, a stator segment 10 of a stator 12 for a (m=3)-phase synchronous reluctance machine with concentrated windings and a rotor (not shown) is shown by way of example and in a non-restrictive manner, wherein in the example shown the 360° stator segment 10 corresponds to the stator 12. The stator segment 10 comprises a ferromagnetic base body 14 with eighteen peripherally distributed tooth structures 16 and a winding system 18 mounted in the tooth structures 16 of the base body 14. The stator segment comprises z=18 tooth structures and a number of 3 winding phases U, V, W corresponding to the number of phases m=3, wherein each winding phase in turn comprises a series connection and/or parallel connection of a plurality of the concentrated windings 20. Here, the stator 12 is provided for a synchronous reluctance machine whose rotor has a pole number p=10 in a peripheral section corresponding to the stator segment (not shown).

Thus, a corresponding "18-10 winding scheme" is achieved in which the three winding phases U, V, W are offset from one another respectively by six tooth structures 16. Each of the three winding phases U, V, W comprises a series connection of twelve concentrated windings 20 which with respect to a phase-specific first tooth structure position 22, 24, 26 has the following winding scheme: first and second windings at said first position, third winding at the third position, fourth winding at the sixth position, fifth and sixth windings at the eighth position, seventh and eighth windings at the tenth Position, ninth winding at the twelfth position, tenth winding at the fifteenth position and eleventh and twelfth windings at the seventeenth position.

Here, for each of the three winding phases U, V, W: the first winding, the second winding, the fifth winding, the sixth winding, the ninth winding and the tenth winding are wound in a first orientation around the respective tooth structure and the third winding, the fourth winding, the seventh winding, the eighth winding, the eleventh winding and the twelfth winding are wound around the respective tooth structure in an opposite second orientation.

If the stator is divided into a plurality of segments this scheme is achieved over all segments in a peripheral direction which is indicated in FIG. 1 by the direction of the arrows.

At the phase-specific seventeenth (tooth structure) position, the respective winding phase U, V, W is fed out of the ferromagnetic base body. Here in this example, the fed out ends of the winding phases U, V, W are connected to a star point 28.

The 3-phase synchronous reluctance machine thus has the following variables: eighteen tooth structures, ten poles (=five pole pairs), winding system as a 4-layer winding with an offset (shift) by 7 teeth (per phase). FIG. 1 shows the corresponding 18-10 winding scheme.

Here, a torque factor of 0.75 can now be achieved. Together with the winding factor of 0.735 the machine achieves a total factor of:

$$F = F_T \cdot F_W = 0.735 \cdot 0.75 = 0.55$$

The exemplary machine with 18 teeth and 10 poles can also be operated in a series connection as a 3-layer machine without leaving the effective range of the optimized design.

Further details and advantages of the disclosure are described in other words below.

During the assembly the stator is wound with concentrated, non-overlapping windings (tooth coils). For this purpose, the winding can be implemented in multiple layers. The winding can be used for round, closed machines as well as for machine segments and linear motors. In order to generate a magnetomotive force MMF with reduced spatial harmonic components, which lead to a high torque density and a good power factor, in contrast to the state of the art two factors have to be applied in the machine pre-design, wherein the first one considered individually is known in principle and only allows a useful motor design for tooth coils in the second subsequent step.

1.) Pre-design based on the winding factor $F_W$: known in the literature and can be read out from tables or calculated for any stator tooth/rotor pole combination;
2.) Pre-design according to the torque factor $F_T$: this newly defined factor enables the calculation of the magnetic utilization of a rotor pole.

As previously explained in detail, it is generally known in the literature that synchronous reluctance machines with concentrated windings are difficult or impossible to implement. This is mainly due to the poor torque factor $F_T$ for conventional concentrated windings. The factor applies to motors with permanent magnets, synchronous reluctance machines as well as any combinations of permanent magnet and reluctance motors. The calculation of the factor applies unchanged to permanent magnet synchronous machines and synchronous reluctance machines. The factor is calculated from the working harmonic MMF wave of the machine, which defines the pole number, and the total resulting MMF from all harmonic components that occur.

The newly used torque factor required for targeted design can be methodically defined as follows:

$$F_T = 1 - \int_0^{2\pi/K} \left(\frac{[MMF(\theta) - H_P(\theta)]}{MMF(\theta)}\right)^2 d\theta$$

Here, the MMF corresponds to the electromagnetic field distribution over the spatial angle. $H_P$ denotes the harmonic amplitude of the working wave, which defines the pole number of the motor. The factor is calculated via the integral of a stator revolution of the angle. The integral is determined from 0° to 360°/K. K corresponds to a division factor which describes the angle section which is covered by the pole number of the stator segment. For a fully loaded round machine, thus K=1.

For concentrated windings, the factor is usually <0.4-0.7.

If now a conventional concentrated winding with one or two levels is divided in a plurality of winding systems and arranged offset by x tooth structures (for x={1, . . . stator tooth number}) in 2 to i levels of 2−x winding systems with respectively one system, when using the evaluation method according to the embodiment of the disclosure and a specific arrangement an overall MMF with low harmonic components and a good torque factor $F_T$ are achieved. The inventors were able to discover in a surprising way on such designed machines that the total utilization of a machine is given by the product of the winding factor $F_W$ and the torque factor $F_T$.

By means of the design method according to the disclosure using these new finding it is possible in a simple way to design machines with high power density, good power factor and low torque ripple more purposefully and without iterative setbacks.

In the following, the procedure according to the disclosure will now be described in more detail based on exemplary machine designs, however, it may be evident to the person skilled in the art to use the method for further machine designs in a different order or specification, which cannot be shown here by way of example but also result analogously within the scope of the method.

Methodical Procedure According to the Disclosure:

1.) Definition of a first number of stator teeth depending on the desired number of phases or a rotor pole number depending on the pole width, the diameter and a desired rotational frequency (speed) of the machine. Here, a design in the range of 50 Hz, 60 Hz, as is customary for industrial machines, or even up to 1000 Hz is conceivable;

2.) Optimization of the formula product until a local maximum is determined over all variables. Here, the stator and rotor pole numbers can be changed again, in particular also the distribution of the coils, according to the disclosure with the variables:
  a. Offset by x teeth;
  b. Distribution of the windings N per tooth structure while optimizing the winding factor;

3.) Calculation of the factor according to the above information;

4.) Geometric pre-design of a bore volume based on the desired performance data and the use of an applied mean rotational shear density (e.g. 25 kN/m$^2$); and 5.) Fine design by use of known methods, e.g. also with the aid of the methods of DOE (Design of Experiment) including
  a. fine design of the flow cross sections;
  b. fine design of the electric loading, the thermal utilization; and
  c. the amount of magnet in relation to the reluctance component.

A tooth structure comprises a total of N windings, wherein for the division of the number of windings of the e.g. two windings per tooth N1 is equal to or may be N2 or N1 is not equal to or may not be N2. According to the manufacturing process for identical number of windings or even different number of windings other coil structures may be useful, so that an assembly can be achieved with an optimized degree of filling. Thus, conical or parallel coils can be installed alternately on the machine without interrupting the relationship according to the formula.

According to the disclosure, all machines with a torque factor $F_T > 0.5$ and $$q = \frac{\#\text{stator teeth}}{\#\text{phases} \cdot \#\text{rotor poles}} < 1$$

are covered.

The trivial case of the pure use of the reluctance force without magnetic material results in an unchanged applicability of the method.

The invention claimed is:

1. Method for designing a stator segment for a stator of an m-phase synchronous reluctance machine with concentrated windings, wherein the stator is capable of being divided into a stator segment or into a plurality of stator segments and comprises a ferromagnetic base body with peripherally distributed tooth structures and a winding system mounted in the base body, which has z tooth structures and a number of winding phases (U, V, W) corresponding to the number of phases m per stator segment, wherein each of the winding phases in turn comprises a series and/or parallel connection of a plurality of the concentrated windings, wherein a rotor of the synchronous reluctance machine has a pole number p in a peripheral section corresponding to a stator segment, the method comprising:
  selecting a stator tooth number z of the tooth structures in a stator segment depending on the phase number m of the phases (U, V, W) and the pole number p;
  determining a winding factor $F_W$ and a torque factor $F_T$ with $$F_T = 1 - \int_0^{2\pi/K} \left( \frac{[MMF(\theta) - H_P(\theta)]}{MMF(\theta)} \right)^2 d\theta$$

for a plurality of design and arrangement options for the winding phases (U, V, W), which result from a given variables pole number p and number of phases m when using concentrated windings with respect to the stator tooth number z, wherein $\theta$ is an angle in a stator rotation direction, MMF is a measure for a spatial distribution of an electric loading, $H_P$ is a harmonic amplitude respectively over the angle $\theta$ and K is a division factor indicating a proportion of the stator segment in a total periphery of the stator; and determining at least one design of the stator segment in which a formula product of winding factor and torque factor $F_T \cdot F_W$ has a local maximum.

2. Method according to claim 1, wherein the plurality of design and arrangement options of the winding phases (U, V, W), for which the winding factor $F_W$ and torque factor $F_T$ are determined, is covered by varying the number of windings and/or a distribution of these windings over the tooth structures of the stator segment.

3. Method according to claim 1, wherein per tooth structure a single winding or a plurality of windings are provided.

4. Method according to claim 1, wherein for systematically going through a design and arrangement options of the winding phases (U, V, W)
  the tooth structures are divided into a plurality of levels with respect to their tooth height;
  a tooth-specific winding is assigned to each tooth structure on each of the levels (E1, E2), so that the same sequence of windings is obtained on each level (E1, E2);
  the windings are connected to the winding phases (U, V, W); and
  positions of the windings are permuted by level-wise shifting a sequence with respect to the tooth structures.

5. Method according to claim 1, wherein a selection of at least one design of the stator segment is done depending on a size of the torque factor $F_T$.

6. Method according to claim 5, wherein the selection of at least one design is done only for a stator tooth number z of the tooth structures per stator segment which is smaller than a product of the number of phases m and the pole number p, which means z<m·p.

7. Method according to claim 1, wherein the winding factor $F_W$ is determined and/or individually calculated from existing data sets.

8. Method according to claim 5, wherein a selection of at least one design of the stator segment is done only for a torque factor $F_T \geq 0.5$.

9. Stator for an m-phase synchronous reluctance machine with concentrated windings which is capable of being divided into one stator segment or into a plurality of stator segments and which comprises a ferromagnetic base body with peripherally distributed tooth structures and a winding system mounted in the base body, which comprises per stator segment a number of tooth structures corresponding to a stator tooth number z and a number of winding phases (U, V, W) corresponding to the number of phases m, wherein each winding phase in turn comprises a series connection of a plurality of twelve concentrated windings, wherein a rotor of the synchronous reluctance machine has a pole number p in a peripheral section corresponding to a stator segment, wherein the number of phases m=3, the pole number p=10 and the number of stator teeth is 18, wherein the series connection of the plurality of twelve concentrated windings has the following winding scheme with respect to a phase-specific first tooth structure position: a first and a second winding at a first position, a third winding at a third position, a fourth winding at a sixth position, a fifth and a sixth winding at an eighth position, a seventh and an eighth winding at a tenth position, a ninth winding at a twelfth position, a tenth winding at a fifteenth position and an eleventh and a twelfth winding at a seventeenth position.

10. Stator according to claim 9, wherein the tooth structures are divided into a plurality of levels (E1, E2) with respect to their tooth height, wherein the same sequence of windings is achieved on each level (E1, E2), wherein the sequence of one of the levels (E1) is offset from the sequence of at least one of the other levels (E2) by at least one tooth structure.

11. Synchronous reluctance machine with concentrated windings, comprising a stator and a rotor, wherein the stator is configured according to claim 10.

12. Stator according to claim 10, wherein for each of the three winding phases (U, V, W)
the first winding, the second winding, the fifth winding, the sixth winding, the ninth winding and the tenth winding are wound in one orientation around the respective tooth structure; and
the third winding, the fourth winding, the seventh winding, the eighth winding, the eleventh winding and the twelfth winding are wound in an opposite orientation around the respective tooth structure.

13. Stator according to claim 9, wherein for each of the three winding phases (U, V, W)
the first winding, the second winding, the fifth winding, the sixth winding, the ninth winding and the tenth winding are wound in one orientation around the respective tooth structure; and
the third winding, the fourth winding, the seventh winding, the eighth winding, the eleventh winding and the twelfth winding are wound in an opposite orientation around the respective tooth structure.

14. Synchronous reluctance machine with concentrated windings, comprising a stator and a rotor, wherein the stator is configured according to claim 9.

\* \* \* \* \*